United States Patent [19]

Steen et al.

[11] Patent Number: 4,777,341
[45] Date of Patent: Oct. 11, 1988

[54] BACK REFLECTION MONITOR AND METHOD

[75] Inventors: William M. Steen, Surrey; Vijitha M. Weerasinghe, London, both of England

[73] Assignee: Quantum Laser Corporation, Edison, N.J.

[21] Appl. No.: 86,861

[22] Filed: Aug. 18, 1987

[51] Int. Cl.⁴ .............................................. B23K 26/02
[52] U.S. Cl. .......................... 219/121.83; 219/121.74; 219/121.62
[58] Field of Search ................. 219/121 LQ, 121 LT, 219/121 LZ, 121 LA, 121 LB, 121 LC, 121 LD, 121 LS; 356/448, 447, 445

[56] References Cited

U.S. PATENT DOCUMENTS

| | | | |
|---|---|---|---|
| 3,892,488 | 7/1975 | Edmonds | 356/153 |
| 4,358,467 | 11/1982 | Patel | 426/237 |
| 4,380,694 | 4/1983 | Dyson | 219/121 LG |
| 4,423,726 | 1/1984 | Imasawa et al. | 128/303.1 |
| 4,476,512 | 10/1984 | Sunago et al. | 361/103 |
| 4,572,941 | 2/1986 | Sciaky et al. | 219/121 LD |
| 4,582,809 | 4/1986 | Block et al. | 356/445 X |

FOREIGN PATENT DOCUMENTS 0205689 11/1983 Japan ............................ 219/121 LZ
0018288 1/1985 Japan ............................ 219/121 LZ Primary Examiner—C. L. Albritton
Attorney, Agent, or Firm—Shlesinger, Arkwright & Garvey

[57] ABSTRACT

A beam monitor comprises a mirror for reflecting an incident beam of radiation to a target and for receiving a reflected beam from the target and has a surface on which the beams impinge. Incident and reflected beam channels are orthogonally disposed within the mirror. Each of the channels has an opening disposed in the surface for admitting the associated beam thereto. First and second detectors are operably associated with the mirror and each generates a signal indicative of a selected characteristic of the beam illuminating the associated channel. A controller compares the generated signals and thereby monitors at least one selected characteristic of the target or of the beam.

24 Claims, 1 Drawing Sheet

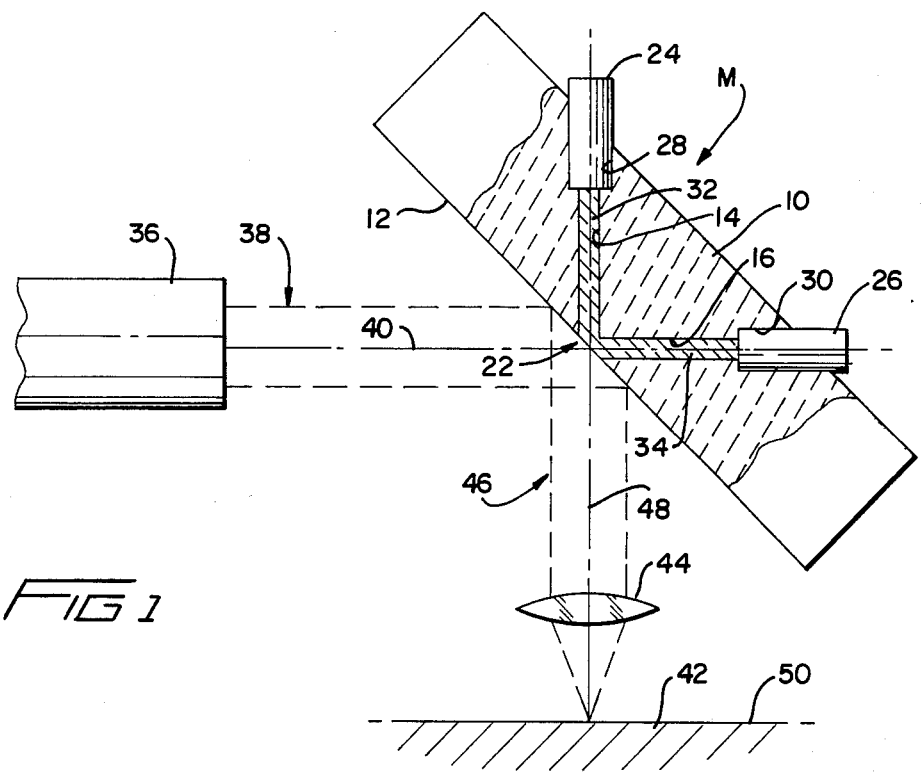
FIG 1
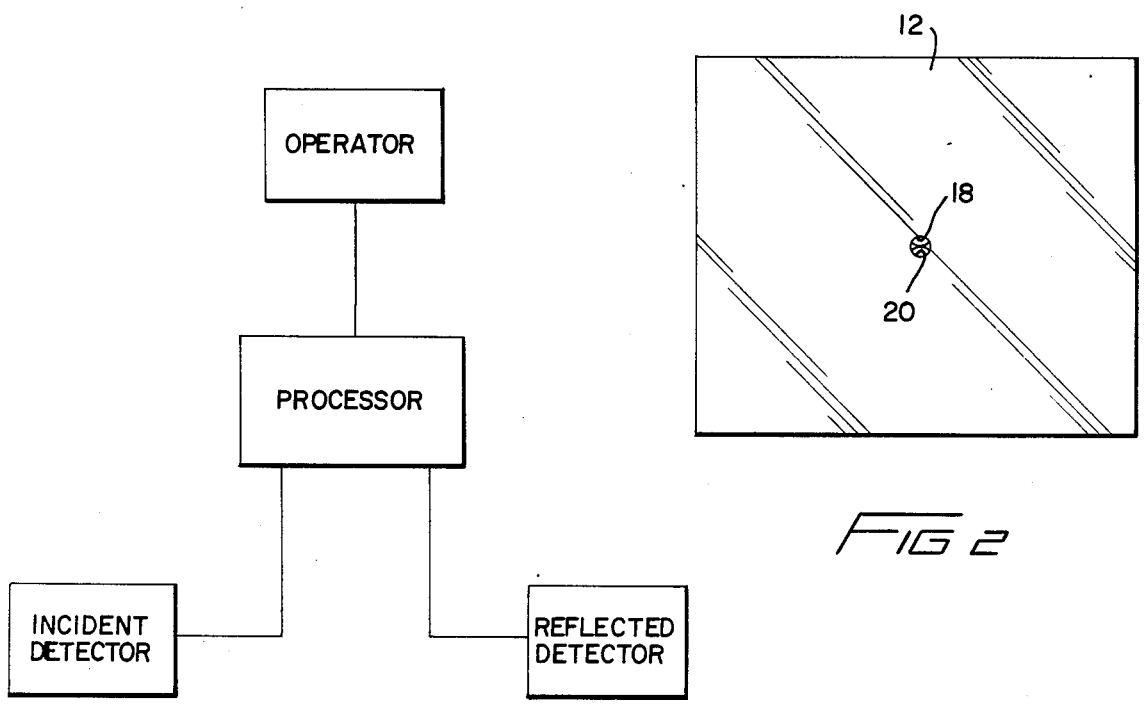
FIG 2
FIG 3

4,777,341

BACK REFLECTION MONITOR AND METHOD

BACKGROUND OF THE INVENTION

The processing of various materials through use of a laser beam is well known, and includes welding, cladding and the like. These various processes all involve the targeting of the beam on the workpiece and, generally, some relative movement is effected between the beam and the workpiece. It is important that the targeted spot and/or the beam be monitored to make sure that the operation is performed as uniformly as possible. Failure to correct for irregularities in any one of a number of beam or workpiece parameters can result in the finished workpiece being unusable.

Various devices are known which cooperate with the laser for targeting the beam on the particular spot on the workpiece. These include a cooperative beam which illuminates the targeted spot in conjunction with the laser beam and which is monitored to assure proper targeting. Furthermore, it is known to monitor the power of the beam, such as by an acoustic mirror.

None of these prior systems, however, makes use of the laser beam itself for monitoring the various parameters of the beam and the workpiece. A substantial amount of information is inherently transported by the beam, as well as by the back reflected beam from the targeted spot, and this information may be interpreted to generate data concerning speed of movement, coupling efficiency and height detection, among other parameters.

In view of the above, it can be seen that there is a need for a beam monitor which makes use of the information inherently transported with the incident beam and with the back reflected beam. The disclosed invention is just such a monitor which continuously compares a selected characteristic of the incident beam with the same characteristic of the back reflected beam, and thereby monitors some particular parameter or parameters of interest. The disclosed invention is an apparatus and a method of using the apparatus which permits precise control to be obtained over the processing operation.

OBJECTS AND SUMMARY OF THE INVENTION

The primary object of the disclosed invention is a method and apparatus for interpreting information which is inherently transported by the incident beam and by the back reflected beam.

The beam monitor of the invention comprises a means for reflecting an incident beam of radiation to a target and for receiving a reflected beam from the target, and including a surface on which the beams impinge. Incident and reflected beam channels are orthogonally disposed within the reflecting means, each of the channels has an opening disposed in the surface for admitting the associated beam thereto. First and second detectors are operably associated with the reflecting means, and each generates a continuous signal indicative of a selected characteristic of the beam illuminating the associated channel. Means are operably associated with each of the detectors for continuously comparing the signals thereof and for thereby monitoring at least one selected characteristic of the target or of the beam.

The method of monitoring information indicative of a workpiece or of a high energy beam operating on the workpiece comprises the steps of interposing a mirror for interception and redirection of an incident high power beam of radiation to a workpiece and for receiving a component thereof reflected from the workpiece. A first signal is continuously generated indicative of a selected characteristic of the incident beam. A second signal indicative of the same characteristic of the reflected beam is continuously generated. The signals are continuously compared and thereby generate information indicative of a selected parameter of the workpiece or of the beam.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is a schematic view, somewhat in section, illustrating the apparatus of the invention;

FIG. 2 is a front elevational view of the mirror of the invention; and,

FIG. 3 is a schematic diagram illustrating the signal processing of the invention.

DESCRIPTION OF THE INVENTION

Mirror M, as best shown in FIG. 1, comprises a body 10 having a surface 12. Preferably, the mirror 10, in combination with the surface 12, is highly reflective to at least selected wavelengths of electromagnetic radiation. The mirror M may be cooled by means well known in the art.

Beam channels 14 and 16 are generally orthogonally disposed relative to each other within body 10. Also, the channels 14 and 16 are, preferably, disposed at an angle of 45° to the surface 12, for reasons to be explained. Each channel 14 and 16 is generally cylindrical and they have openings 18 and 20, respectively, disposed within surface 12, as best shown in FIG. 2. As can be seen in FIGS. 1 and 2, the combined openings 18 and 20 form a generally circular aperture 22 which provides a common opening for the beam channels 14 and 16.

Detectors 24 and 26 are seated within body 10 in alignment with beam channels 14 and 16, respectively. Preferably, each of the beam channels has a reduced diameter portion and an enlarged diameter portion 28 and 30, respectively. The detectors 24 and 26 are seated in the enlarged portions 28 and 30, respectively in order to be precisely positioned in axial alignment with the beam channels 14 and 16.

Optical fibers 32 and 34 are, preferably, positioned within the channels 14 and 16, respectively, and thereby couple the detectors 24 and 26 with the respective openings 18 and 20. The optical fibers are of a type well known in the art and are sometimes known as wave guides and improve the accuracy of the detectors 24 and 26 by minimizing radiation losses and other beam detracting effects.

Each of the detectors 24 and 26 is, preferably, a pyroelectric device, although other radiation monitors may be used, such as the acoustic mirror. Those skilled in the art understand that a pyroelectric device is one wherein opposite electric charges are disposed on different parts of a crystal that is subjected to temperature change and the pyroelectric effect is exhibited in quartz and other substances. Generally, such devices are a crystallized nonconducting substance with at least one axis of symmetry that is polar.

Laser generator 36 directs a laser beam 38 to the mirror M. The beam 38 has an axis 40 which is in alignment with the axis of beam channel 16 and detector 26. Preferably, the beam 38 is circular in section and has a diameter substantially in excess of the diameter of beam channel 16. Naturally, a small portion of the beam 38 will pass through the opening 18 and thereby illuminate the channel 16, while the remainder of the beam 38 is reflected toward workpiece 42. A targeting lens 44 is preferably in alignment with the reflected portion of beam 38 in order to assure proper focusing of the beam 38 on the workpiece 42.

A beam 46 is reflected back from workpiece 42 through lens 44 toward mirror M. The beam 46 has an axis 48 which is coaxial with beam channel 14 and detector 24. In this way, a portion of the beam 46 is admitted to beam channel 14 through opening 18 and thereby illuminates the channel 14. Naturally, no portion of the beam 48 can enter the channel 16 through its opening 20 because there is no window for entry. Likewise, there is no window for entry of the beam 38 into the channel 14 through opening 18.

The workpiece 42 is, typically, movable relative to the mirror M and the beam generator 36. In this regard, those skilled in the art will understand that the workpiece 42 is likewise subject to surface irregularities which the processing system must accommodate for uniform operation to be effected.

Most laser beams, even high powered beams, are coherent. This means that the beam is a single phase. Thus, if the distance from the mirror M to the workpiece 42 changes, then there will be a cooperative shift in intensity between the incident and the reflected radiation. For example, should the height shift by $\lambda/4$, where $\lambda$ is the wavelength of the beam, then there will be a shift of $\lambda/2$ between the incident and the reflected radiation. A comparison of the intensity between the two will, therefore, permit the height shift to be detected.

Signal strength variations permit coupling efficiency to be determined. The power of the back reflected beam 46, whether filtered or unfiltered, is an indicator of the surface reflectivity of the workpiece 42. Coupling efficiency is equal to the fraction of power absorbed which is proportional to the reflectively of opaque materials. Therefore, comparing the power of the incident beam with the power in the back reflected beam can permit the coupling efficiency to be continuously monitored.

Each of the beams 38 and 46 has a frequency of operation. A comparison of the frequency of the beam 38 with the frequency of the beam 46 permits a doppler shift to be detected, thereby permitting the velocity of the workpiece 42 to be determined.

The back reflected beam 46 will have an AC and a DC component. We believe that the AC component has data on striation formation during cutting, weld pool ripple structure, cladding surface finish, pool size and the like. Therefore, monitoring of the AC component will permit this data to also be continuously monitored.

As noted, the mirror M, and its surface 12, are, preferably, disposed at an angle of 45° to the surface 50 of the workpiece 42. In this way, we assure that the beam 38 will illuminate the beam channel 16, and the beam 46 will illuminate the beam channel 14. While other angulations are possible, we have found that the 45° angle works best and minimizes any targeting and redirection of the beam 46 as may be necessary. Naturally, an angle of other than 45° will require that the beam channels 14 and 16 be other than orthogonally disposed.

FIG. 3 discloses a schematic illustrating the processing scheme of the invention. The incident detector, which corresponds to the detector 26, and the reflected detector, which corresponds to the detector 24, both continuously feed their resulting signal to the processor. The processor may include an electrical controller or other electronic device which has the capability of continuously comparing one signal with regard to the other. Naturally, the processor can be either analog or digital without departing from the scheme of the invention. The resulting signal, based upon the continuous comparison of the two input signals, is then transmitted to an operator for causing a selected characteristic of either the workpiece 42 or the mirror M to be adjusted, when called for. For example, should the workpiece 42 be moving at too great a speed, then the resulting signal can cause the workpiece 42 to slow down. Similarly, the laser generator 36 and the mirror M may each be dependent from a common support so that variations in height of the workpiece 42 can cause cooperative shifting of the laser generator 36 and the mirror M.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention of the limits of the appended claims.

What we claim is:

1. A beam monitor, comprising:
   (a) means for reflecting an incident beam of radiation to a target and for receiving a reflected beam from the target and including a surface on which the beams impinge;
   (b) incident and reflected beam channels disposed within said reflecting means, each of said channels having an opening disposed in said surface for admitting the associated beam thereto;
   (c) first and second detector means, each detector means operably associated with one of said channels for generating a signal indicative of a selected characteristic of the beam illuminating the associated channel; and,
   (d) means operably asociated with each of said detector means for comparing the signals thereof and for thereby monitoring at least one selected characteristic of the target or of the beam.

2. The monitor of claim 1, wherein:
   (a) said openings sharing a common aperture in said surface.

3. The monitor of claim 1, wherein:
   (a) said surface being reflective.

4. The monitor of claim 3, wherein:
   (a) said reflecting means including a body; and,
   (b) each of said detector means being mounted in said body.

5. The detector of claim 1, wherein:
   (a) each of said openings having a diameter substantially less than the diameter of the associated beam; and, (b) said channels being orthogonally disposed relative to each other.

6. The monitor of claim 1, further comprising:
(a) optical fiber means positioned in at least one of said channels for coupling the associated detector means with the associated opening.

7. The monitor of claim 4, wherein:
(a) each of said channels having a first portion and a second portion, the first portion having a diameter in excess of the diameter of the second portion; and,
(b) each of said detector means seated within the associated first portion.

8. The monitor of claim 1, wherein:
(a) each of said detector means is a pyroelectric device.

9. The monitor of claim 8, wherein:
(a) each of said devices adapted for detecting any one of the phase of the beams, coupling efficiency and frequency of the beams.

10. A back reflection monitor, comprising:
(a) mirror means for reflecting an incident beam to a target and for receiving a beam reflected from the target and including a surface on which the beams impinge and a body;
(b) incident and reflected beam channels orthogonally disposed to each other within said body, each of said channels being generally cylindrical and having a circular opening in said surface for admitting the associated beam;
(c) first and second detector means, each detector means operably associated with one of said channels for generating a signal indicative of a selected parameter of the beam illuminating the associated channel;
(d) means operably associated with each of said detector means for comparing the signals thereof and for thereby monitoring selected information related to the parameter being detected; and,
(e) means operably associated with said comparing means for operating on the target based upon the information being monitored.

11. The monitor of claim 10, wherein:
(a) each of said detector means is a pyroelectric device.

12. The monitor of claim 10, further comprising:
(a) optical fiber means positioned within each of channels for coupling the associated detector means with the associated opening.

13. The monitor of claim 10, wherein:
(a) each of said channels having a first portion of a first diameter and a second portion of a reduced diameter;
(b) said second portion having a length in excess of the length of the associated first portion; and,
(c) each of said detector means seated within the associated second portion.

14. The monitor of claim 13, wherein:
(a) said openings sharing a common aperture in said surface.

15. The monitor of claim 10, wherein:
(a) said surface disposed at an angle of substantially 45° with respect to the target.

16. The method of monitoring information indicative of a workpiece or of a high energy beam operating on the workpiece, comprising the steps of:
(a) interposing a mirror means for interception and redirection of an incident high power beam of radiation to a workpiece and for receiving a component thereof reflected from the workpiece;
(b) generating with a first means operably associated with the mirror means a first signal indicative of a selected characteristic of the incident beam;
(c) generating with a second means operably associated with the mirror means a second signal indicative of the same characteristic of the reflected beam; and,
(d) comparing the signals and thereby generating information indicative of a selected parameter of one of the workpiece and the beam.

17. The method of claim 16, including the steps of:
(a) generating a first signal indicative of the phase of the incident beam;
(b) generating a second signal indicative of the phase of the reflected beam; and,
(c) comparing the signals and thereby determining the distance from said mirror means to the workpiece.

18. The method of claim 16, including the steps of:
(a) generally a first signal indicative of the power of the incident beam;
(b) generating a second signal indicative of the power of the reflected beam; and,
(c) comparing the signals and thereby determining the coupling efficiency.

19. The method of claim 16, including the steps of:
(a) generating a first signal indicative of the frequency of the incident beam;
(b) generating a second signal indicative of the frequency of the reflected beam; and,
(c) comparing the signals and thereby determining the relative velocity between the mirror means and the workpiece.

20. The method of claim 18, including the step of:
(a) generating the signals with a pyroelectric device.

21. The method of claim 16, including the step of:
(a) generating the signals with detector means mounted to said mirror means.

22. The method of claim 16, including the steps of:
(a) providing a mirror means comprising a body and a surface on which the beams impinge, said body having first and second channels and an opening in said surface for admitting the associated beam to the associated channel and each channel aligned with one of said beams; and,
(b) generating the signals with detector means operably associated with each of said channels.

23. The method of claim 22, including the step of:
(a) optically coupling each detector means with the associated beam by optical fibers extending between the associated opening and the associated detector means.

24. The method of claim 22, including the steps of:
(a) orthogonally disposing said channels; and,
(b) mounting said mirror means so that said surface is at an angle of 45° to the workpiece.

* * * * *